June 29, 1965

J. A. FRYE 3,191,912

MIXING APPARATUS FOR PRODUCING OIL WELL
FORMATION FRACTURING COMPOSITIONS

Filed Dec. 19, 1961

INVENTOR.
JAMES A. FRYE
BY
*Lyon & Lyon*
ATTORNEYS

United States Patent Office

3,191,912
Patented June 29, 1965

3,191,912
MIXING APPARATUS FOR PRODUCING OIL WELL FORMATION FRACTURING COMPOSITIONS
James A. Frye, Duncan, Okla., assignor to Halliburton Company, Duncan, Okla., a corporation of Delaware
Filed Dec. 19, 1961, Ser. No. 160,609
3 Claims. (Cl. 259—7)

In order to increase the productivity of oil wells, a procedure known as hydraulic fracturing has been found to be highly effective. This procedure comprises the introduction of fluid mixtures under pressure to effect penetration through porous formations and then applying very high pressures on the fluid to effect the fracture in the formation. This fracturing of subsurface formations provides lateral drainage channels at selected levels which increase the productivity of the well. It has also been found highly advantageous to use solid substances, such as sand, as propping agents to penetrate into the formation and fracture to prevent closing of the fracture channels when the high pressure is relaxed.

The present invention relates to apparatus for the production of a highly effective propping agent which may be used with a suitable carrier, e.g., oil, as a fracturing composition. It has been found to be highly advantageous to coat the particulate material which is to be used as the propping agent with a resin. Resins such as urea-formaldehyde, which are thermo-setting, are used. These resins are applied in liquid form, and after the fracturing composition has been introduced into the formation, harden to convert the resin-coated propping agent to a substantially rigid, permeable mass. It has further been found that a wide range of particulate materials, e.g., crushed coconut and walnut shells, aluminum pellets, sand, etc., are suitable for use in such fracturing compositions.

However, serious problems have arisen with respect to providing a satisfactory coating on the particulate material. The resin must be applied to the particulate material shortly before it is to be introduced into the formation because the resin-coated particles will harden or "set" if allowed to stand for any substantial length of time. This means that the coating must be performed at the well site, which has proven to be extremely difficult because simple mixing procedures do not provide the particulate material with a satisfactory coating. The use of complicated and expensive coating machinery at the well site is obviously undesirable for economic reasons. In addition, in the case of wells located in remote, relatively inaccessible areas, it would be difficult to transport such machinery and to operate it at the well site. The present invention obviates these difficulties.

It is an object of the present invention to provide apparatus for providing a propping agent with a resin coating at the well site.

It is another object of the present invention to provide apparatus for coating a propping agent, which apparatus may be easily converted to other important oil field uses.

Briefly stated, the invention contemplates the use of a screw conveyor for coating a propping agent with a suitable coating.

Other and more detailed objects will appear hereinafter.

Figure 1:
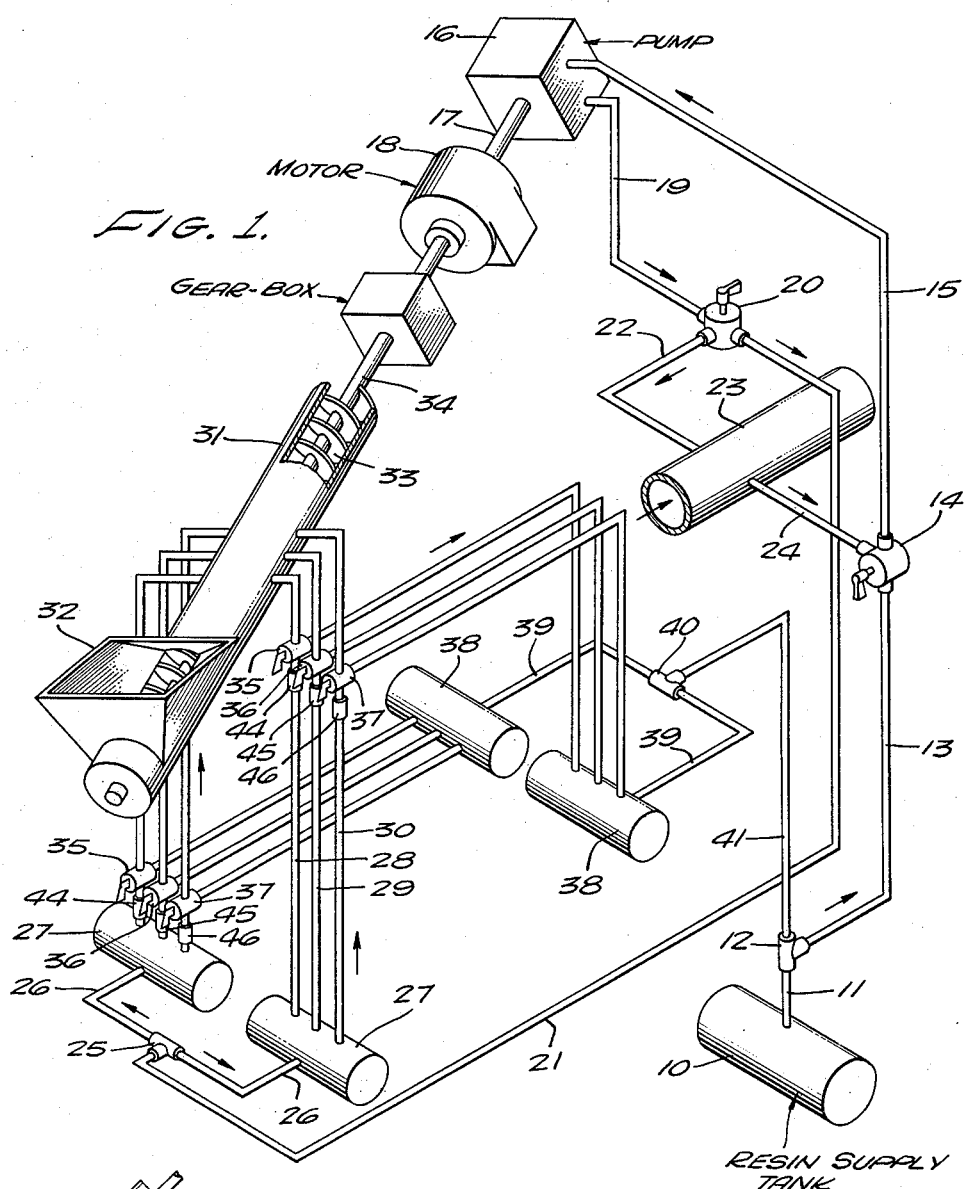
FIGURE 1 is a diagrammatic illustration of a preferred form of apparatus embodying the present invention.

Referring to the drawings, the resin supply generally designated 10 is connected to pipe 11. Pipe 11 is connected to pipe 13 by valve 12. Pipe 13 leads to three-way valve 14 which connects pipes 13, 15 and 24. Pipe 15 is connected to the intake, or suction side of pump 16. Pump 16 is preferably a rotary, positive-displacement pump. Pump 16 is driven by shaft 17 which is connected to power source 18.

Pump 16 discharges into pipe 19 which is connected, via three-way valve 20, to pipes 21 and 22. Pipe 22 is connected to manifold 23, which is in turn connected to pipe 24 to complete a by-pass conduit to connection 14.

Pipe 21 is connected to pipes 26 througt three-way connection 25. Pipes 26 are connected to headers 27 which discharge into pipes 28, 29 and 30. Pipes 28, 29 and 30 are connected to the rotating screw conveyor indicated generally by 31. Pipes 28, 29 and 30 are provided with throttling valves 44, 45 and 46, respectively, to regulate fluid flow through each pipe.

Conveyor 31 is provided with hopper 32 and rotating screw 33. The conveyor screw 33 is driven by shaft 34 which is connected to power source 18.

Pipes 28, 29 and 30 are provided with three-way valves 35, 36 and 37, respectively which are connected to headers 38. Headers 38 are also provided with pipes 39 which are connected to three-way connection 40. Connection 40 is also connected to pipe 41 which terminates at connection 12.

Figure 2:
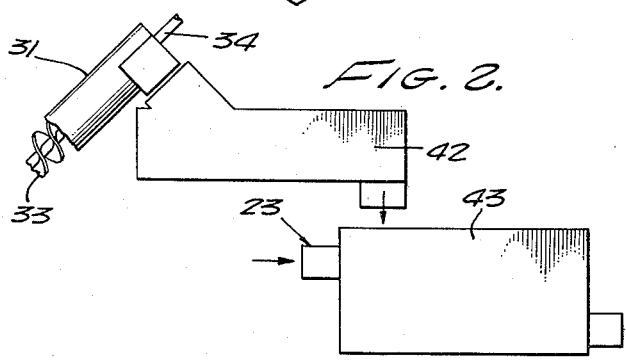
FIGURE 2 is a diagrammatic illustration of a preferred form of apparatus for combining the coated propping agent produced by this invention with a fracturing liquid.

FIGURE 2 illustrates equipment which may be used to further process the material discharged from conveyor 31. The fluid mass discharged from conveyor 31 may be combined with fracturing fluid, such as oil, in mixer tank 42. The mixing elements in this tank may be horizontal screws or paddles or other equivalent elements. Optionally, if it is desired to simply mix the discharge from conveyor 31, mixing tank 42 may be used for this purpose. In this case, the mixed material is discharged from mixing tank 42 into a skid-mounted ribbon blender 43. The fracturing fluid is then added to blender 43 through pipe 23 and the discharge transmfitted to a pumping unit. The product from mixer 42 or blender 43, depending upon which embodiment is employed, is then applied directly to the formation.

In operation, the apparatus of FIGURE 1 transmits the resin from the resin supply 10 to the screw conveyor 31 by pumping it, by means of pump 16, through pipes 11, 13, 15, 19, 21, 26, 28, 29 and 30. The operation of the apparatus is quite flexible and the amount of resin which passes through the system to the conveyor may be varied within wide limits. For example, if it is desired not to coat the propping agent at all, the appropriate connections are made in elements 14 and 20 such that fracturing fluid only passes through the by-pass system comprising pipes 22 and 24 and pipe 23. When the system is so operated, no resin reaches pipe 21. This arrangement is particularly advantageous because it permits the resin pump to be driven by the same power source as the conveyor screw, but does not require a clutch and avoids the harmful effects of dry-running the resin pump 16.

Furthermore, the apparatus of this invention permits control of the volume of resin injected into the screw conveyor without using a transmission or variable speed drive between the screw conveyor and resin pump. This is accomplished by making the appropriate adjustment in valves 35, 36 and 37, thus returning a portion of the resin to headers 38 and eventually to connection 12 for recycle to resin pump 16. Throttle valves 44, 45 and 46 provide further individual adjustment. The three-way valves used in the apparatus of this invention may be of the conventional ported plug type. The suction of the resin pump can be charged by opening the valves on the lines being used to by-pass the fluid to headers 38 slightly more than those on the injection lines.

It has been found desirable to equip the injection lines which are attached to the screw conveyor with quickconnection couplings in order that they may be removed from the conveyor and attached to a graduated container for calibration of the system to the exact resin:particulate material ratio desired.

The screw conveyor 31 of the apparatus of this invention is inclined with respect to the horizontal. This inclination of the conveyor promotes intimate contact and satisfactory coating of the particulate material. It is a particular advantage of the present invention that the screw conveyors conventionally used in oil field operations to transport sand from hoppers to tanks wherein it is combined with fracturing fluid may be used in the practice of this invention. In a preferred form of this invention, the inlets on the conveyor barrel which are provided for pipes 28, 29 and 30 are spaced apart axially by an amount equal to the lead of the screw of the conveyor. The resin is thus injected between successive flights of the screw. Furthermore, it is to be understood that, although six inlets on the barrel of the conveyor 31 are illustrated in FIGURE 1, a lesser number may be employed to achieve the beneficial results of the present invention. The use of three or more inlets does, however, improve the coating action of the conveyor somewhat.

As previously noted, the apparatus of this invention makes possible the use of a single power source to drive both the resin pump and the screw conveyor. This is of great importance because it eliminates the need for a clutch and variable speed transmission which would be burdensome in oil field operations. It has been found particularly suitable to drive the pump by means of a chain and sprocket attached to the drive shaft of the screw conveyor.

The following specific example is illustrative of the process of this invention, but it is to be understood that the invention is not to be limited to the specific details thereof:

One hundred and fifty pounds of crushed coconut shells were fed to a six-inch sand screw conveyor rotating at 234 r.p.m. A resin composition comprising U.S. 85, a urea-formaldehyde resin manufactured by the Allied Chemical Company, was fed to the lower end of the conveyor through three inlets centered four inches apart along the axis of the conveyor. The resin was added in an amount of 42% by weight of the coconut shells. The product was found to set satisfactorily and had good fluid permeability. When the product was hardened at room temperature the permeability was found to be 72.8 darcys, and when hardened at 115° F. the permeability was found to be 67.9 darcys.

It will be obvious to one skilled in the art that the proportions of materials, as well as the materials themselves, may be varied. It has been found that, in general, a resin content of from ten to fifty percent by weight is satisfactory.

It will further be apparent to one skilled in the art that various modifications in the foregoing description may be made without departing from the present invention. For example, hoses or other suitable conduits may be substituted for the pipes of the apparatus. The inclination of the screw conveyor is not critical, but an inclination of 30°–60° has been found to give good results.

Having fully described the invention, it is to be understood that it is not to be limited to the details herein set forth, but that the invention is of the full scope of the appended claims.

I claim:

1. An apparatus for coating a propping agent comprising a means for supplying coating material, a screw conveyor, a pump, a first conduit connecting said supply means and said pump, a second conduit connecting said pump and said conveyor, and a third conduit connecting said first conduit and said second conduit, said third conduit being provided with a manifold, said manifold being adapted to convey a fluid, said third conduit being connected to said first and second conduits by means of a first valve and a second valve, said valves being adapted to operate to permit a first fluid to flow through said first and second conduits without flowing through said third conduit and to permit a second fluid to flow from said manifold, through said first valve, said pump, said second valve and back to said manifold while simultaneously preventing said second fluid from flowing to said supply means or said conveyor.

2. The apparatus of claim 1 wherein said pump and said conveyor are provided with a common drive means.

3. An apparatus for producing fracturing fluid comprising a source of resin, a screw conveyor, said conveyor comprising a screw and a barrel, a conduit connecting said source and said conveyor, a pump disposed in said conduit, a first dividing means disposed between said pump and said conveyor for dividing said conduit into two primary branches, a pair of second dividing means disposed in said primary branches between said first dividing means and said conveyor, said second dividing means dividing each of said primary branches into at least three secondary branches, inlet means connecting each of said secondary branches to said barrel, said inlet means being spaced equidistantly from each other so as to coincide with the lead of said screw, diverting means disposed in each of said secondary branches for diverting at least a portion of said resin from said conveyor, means for connecting said diverting means to the inlet side of said pump, connecting means disposed between said source and said first dividing means for connecting the discharge side of said pump to the intake side of said pump, a manifold disposed in said connecting means, a hopper disposed on said conveyor, said conveyor being inclined, a common drive means for said pump and said conveyor, a discharge means disposed on said conveyor, and a mixing means disposed such that it will receive the discharge from said conveyor, said connecting means being connected to said conduit by a first valve and a second valve, said valves being adapted to operate to permit a first fluid to flow through said conduit without flowing through said connecting means and to permit a second fluid to flow through said manifold, through said first valve, said pump, said second valve and back to said manifold while simultaneously preventing said second fluid from flowing to said source or said conveyor.

References Cited by the Examiner

UNITED STATES PATENTS

| | | | |
|---|---|---|---|
| 133,139 | 11/72 | Best | 259—7 X |
| 741,189 | 10/03 | Thompson | 259—7 X |
| 1,611,297 | 12/26 | Wickey | 259—178 X |
| 1,753,716 | 4/30 | Owen | 259—168 X |
| 1,781,435 | 11/30 | Carper | 259—7 X |
| 1,861,721 | 6/32 | Scott | 259—7 X |
| 2,276,237 | 3/42 | Lowry | 259—168 X |
| 2,562,867 | 7/51 | Kurtz et al. | 166—33 X |
| 2,573,690 | 11/51 | Cardwell et al. | 166—33 |
| 2,764,218 | 9/56 | Richards | 259—168 X |
| 2,915,299 | 12/59 | Woebcke | 259—8 |
| 2,957,427 | 10/60 | O'Connor | 259—7 |
| 3,012,977 | 12/61 | Wilson et al. | 259—7 X |
| 3,067,987 | 12/62 | Ballou et al. | 259—7 |

WALTER A. SCHEEL, *Primary Examiner.*

CHARLES A. WILLMUTH, *Examiner.*